(12) United States Patent
Nautiyal et al.

(10) Patent No.: US 10,831,578 B2
(45) Date of Patent: Nov. 10, 2020

(54) FAULT DETECTION CIRCUIT WITH PROGRESS REGISTER AND STATUS REGISTER

(71) Applicant: NXP USA, INC., Austin, TX (US)

(72) Inventors: Hemant Nautiyal, Noida (IN); Jan Chochola, Ostrava (CZ); Ashish Kumar Gupta, Noida (IN); David Baca, Roznov pod Radhostem (CZ)

(73) Assignee: NXP USA, INC., Austin, TX (US)

( * ) Notice: Subject to any disclaimer, the term of this patent is extended or adjusted under 35 U.S.C. 154(b) by 133 days.

(21) Appl. No.: 16/145,193

(22) Filed: Sep. 28, 2018

(65) Prior Publication Data
US 2020/0104204 A1 Apr. 2, 2020

(51) Int. Cl.
| | |
|---|---|
| *G06F 11/07* | (2006.01) |
| *B60R 21/01* | (2006.01) |
| *G06F 9/30* | (2018.01) |
| *G06F 13/16* | (2006.01) |
| *G06F 13/24* | (2006.01) |

(52) U.S. Cl.
CPC ........ *G06F 11/0739* (2013.01); *B60R 21/01* (2013.01); *G06F 9/30189* (2013.01); *G06F 11/0724* (2013.01); *G06F 11/0772* (2013.01); *G06F 11/0796* (2013.01); *G06F 13/1663* (2013.01); *G06F 13/24* (2013.01); *B60R 2021/01129* (2013.01); *B60R 2021/01286* (2013.01); *G06F 11/0793* (2013.01)

(58) Field of Classification Search
CPC ............ G06F 11/0793; G06F 11/0766; G06F 11/079; G06F 11/3612; G06F 11/3688; G06F 11/0709; G06F 11/0706
See application file for complete search history.

(56) References Cited

U.S. PATENT DOCUMENTS

| | | | |
|---|---|---|---|
| 5,277,971 A | 1/1994 | Weng et al. | |
| 6,625,749 B1 | 9/2003 | Quach | |
| 6,938,183 B2 | 8/2005 | Bickel | |
| 7,055,060 B2 | 5/2006 | Nguyen et al. | |
| 7,383,490 B2 * | 6/2008 | Almasi ............... | G06F 11/1633 714/100 |
| 7,543,174 B1 * | 6/2009 | van Rietschote ... | G06F 11/2025 709/223 |
| 7,590,727 B1 * | 9/2009 | Barnes ................ | G06F 11/2023 709/208 |

(Continued)

*Primary Examiner* — Nadeem Iqbal

(57) ABSTRACT

A processing system, such as for an automobile, includes multiple processor cores, including an application core and a safety core, and a fault detection circuit in communication with the processor cores. The fault detection circuit includes a progress register for storing progress data of an application executed on the application core. The safety core, which executes a fault detection program, reads the progress data from the progress register, and generates an output based on the progress data and an expected behavior of the application. The safety core writes the output to a status register of the fault detection circuit. The fault detection circuit includes a controller that reads the status register and generates a fault signal when the output indicates there is a fault in the execution of the application. In response, the application core either recovers from the fault or runs in a safe mode.

20 Claims, 4 Drawing Sheets

(56) References Cited

U.S. PATENT DOCUMENTS

| | | | |
|---|---|---|---|
| 7,802,128 B2* | 9/2010 | Dasari | G06F 11/1482 |
| | | | 714/10 |
| 8,373,435 B2 | 2/2013 | Bogenberger et al. | |
| 8,892,943 B2* | 11/2014 | Ingimundarson | G06F 11/1048 |
| | | | 714/10 |
| 9,643,558 B2 | 5/2017 | Krishna et al. | |
| 10,002,057 B2 | 6/2018 | Scobie et al. | |
| 2006/0248370 A1* | 11/2006 | Almasi | G06F 11/1633 |
| | | | 714/4.1 |
| 2009/0183035 A1 | 7/2009 | Butler | |
| 2010/0146335 A1 | 6/2010 | Moyer | |
| 2011/0066779 A1 | 3/2011 | Bogenberger et al. | |
| 2011/0191627 A1* | 8/2011 | Koning | G06F 11/00 |
| | | | 714/5.1 |
| 2013/0332907 A1* | 12/2013 | Warren | G06F 9/448 |
| | | | 717/125 |
| 2016/0004535 A1 | 1/2016 | Robertson et al. | |
| 2017/0190358 A1 | 7/2017 | Kobayashi | |
| 2017/0293516 A1 | 10/2017 | Baca | |
| 2018/0011804 A1 | 1/2018 | Pedersen | |

* cited by examiner

FAULT DETECTION CIRCUIT WITH PROGRESS REGISTER AND STATUS REGISTER

BACKGROUND

The present invention relates generally to electronic circuits, and, more particularly, to a fault detection circuit for detecting operational faults in electronic systems.

Fault detection systems are used to detect faults in electronic systems, such as those used in automobiles, like airbag control systems, anti-lock braking (ABS) systems, and electronic stability program (ESP) systems. Fault-free operation of these complex electronic circuits is necessary for safe vehicle operation, hence detection of faults is essential so that the faults can be rectified, and the systems can operate as designed. Other examples of electronic systems that make use of fault detection systems include industrial robots, home security systems, and aircraft guidance systems.

Conventional methods of detecting faults include lock-step, Error Correcting Code (ECC), monitoring, and redundancy checks. An electronic system that has a lock-step fault detection mechanism requires at least two processor cores so that the same set of instructions can be executed in parallel. Outputs of the cores are compared, and a fault is detected if there is a mismatch between the outputs. Fault detection systems that rely on redundancy require complex software architectures to switch between modules, which requires a lot of computational resources.

It would be advantageous to have a more efficient fault detection system.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
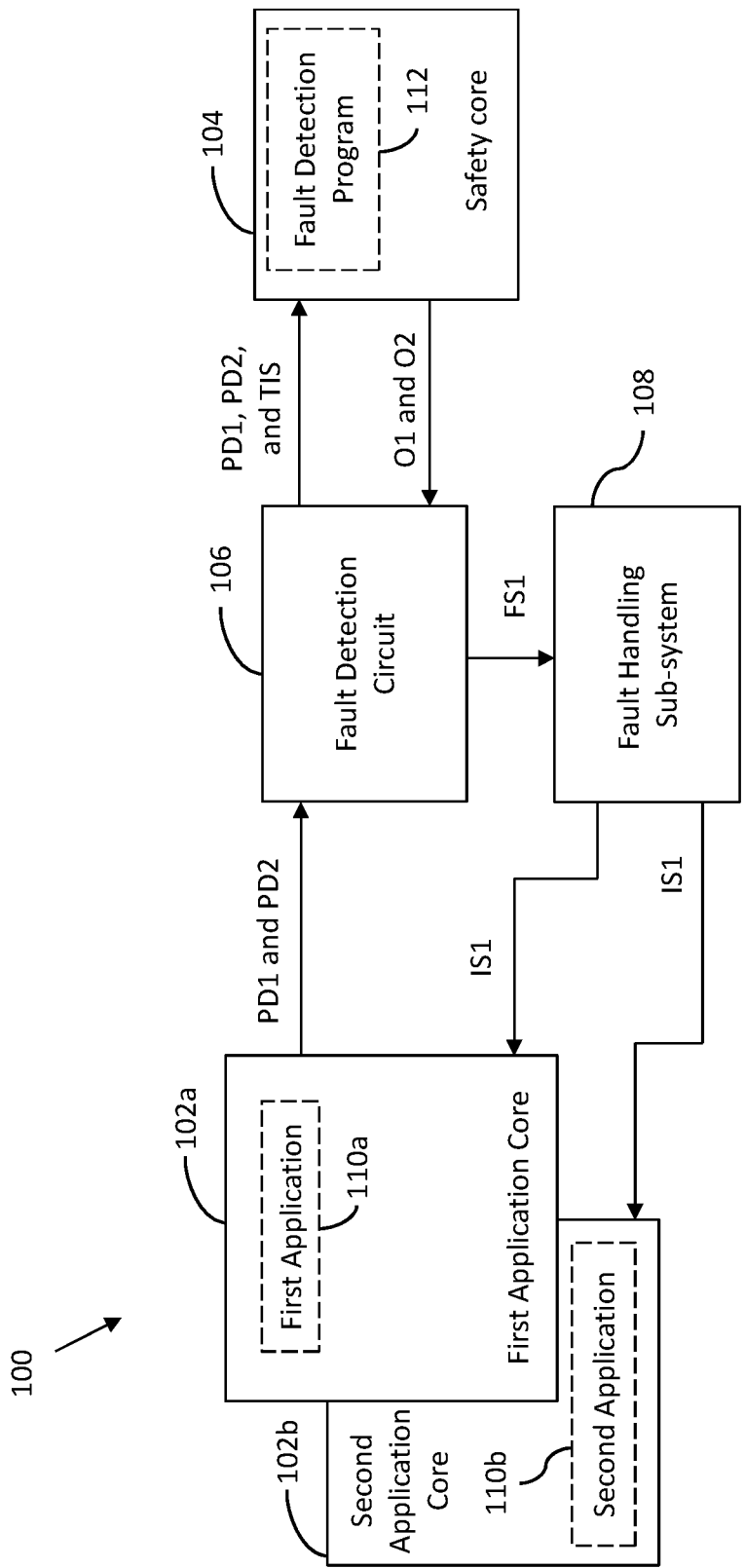
FIG. 1 is a schematic block diagram of a processing system including a fault detection circuit in accordance with an embodiment of the present invention.

The detailed description of the appended drawings is intended as a description of the currently preferred embodiments of the present invention and is not intended to represent the only form in which the present invention may be practiced. It is to be understood that the same or equivalent functions may be accomplished by different embodiments that are intended to be encompassed within the spirit and scope of the present invention.

In one embodiment, the present invention provides a fault detection circuit that is in communication with a plurality of processor cores including an application core and a safety core. The fault detection circuit includes a progress register, a status register, and a controller. The progress register stores progress data of an application executed on the application core. The progress data is written to the progress register by the application core, and the progress data is read by the safety core for verifying the execution of the application. The status register stores an output of a fault detection program executed by the safety core. The fault detection program, which is executed in firmware, generates the output using the progress data, and writes the output to the status register. The controller reads the output stored in the status register and generates a fault signal when the output indicates a fault in the execution of the application.

In another embodiment, the present invention provides a processing system that includes a plurality of processor cores, including an application core and safety core, and a fault detection circuit in communication with the plurality of processor cores. The application core runs an application and the safety core executes a fault detection program, stored as firmware, to verify the execution of the application. The fault detection circuit includes a progress register, a status register, and a controller. The progress register stores progress data of the application. The progress data is written to the progress register by the application core. The safety core reads the stored progress data and uses the progress data to verify the execution of the application. The status register stores an output generated by the fault detection program. The fault detection program generates the output based on the progress data. The output is written to the status register by the safety core. The controller reads the output stored in the status register and generates a fault signal when the output indicates a fault in the execution of the application.

Various embodiments of the present invention provide a processing system including a fault detection circuit that is in communication with a plurality of processor cores including an application core and a safety core. The application core executes an application and the safety core executes a fault detection program, which preferably is stored as firmware, to verify the execution of the application. The safety core loads configuration data for the fault detection program from a main memory of the processing system to a local memory of the safety core. The configuration data includes a machine-readable description of at least one timed finite-state automaton, which represents a model of an expected behavior of the application. The fault detection circuit includes a set of registers, an access control module, and a controller. The set of registers includes a progress register for storing progress data of the application and a status register for storing an output of the fault detection program. The set of registers further includes an identification register for storing a first identifier and a configuration register for storing a memory address where the configuration data is stored. The access control module grants the application and safety cores selective access to the set of registers based on the first identifier stored in the identification register.

Based on the selective access granted to the application core, the application core writes the progress data (i.e., a current state of operation) to the progress register. The progress register includes a first set of bits that stores the progress data, and first and second flag bits. The first flag bit is set by the fault detection circuit when the progress data is written to the progress register. If the first flag bit was already set when the progress data is written to the progress register, then the second flag bit is set.

The controller includes a programmable timer and a programmable timer register. The programmable timer register stores a timer value that is loaded by the safety core. The programmable timer runs periodically based on the timer value and the controller generates a timer interrupt signal when the programmable timer times out. The controller transmits the timer interrupt signal to the safety core to enable periodic execution of the fault detection program by the safety core, thereby enabling the safety core to periodically read the progress register.

Based on the selective access granted to the safety core, the safety core reads the progress data, and the first and second flag bits from the progress register. The read operation performed by the safety core clears the first and second flag bits of the progress register. The fault detection program compares the progress data with an expected state (i.e., the expected behavior of the application) exhibited by the automaton, and generates the output based on the comparison. The safety core stores the output in its local memory and also writes the output to the status register.

The controller reads the output from the status register and generates a fault signal when the output indicates a fault in the execution of the application. The fault is caused when one of a state sequence of the application, a timing of the state sequence, or a stay period of at least one state of the state sequence, is incorrect. In one embodiment, the application core recovers from the fault based on the fault signal. In another embodiment, the application core executes the application in a safe mode when the fault signal is set. In yet another embodiment, the processing system including the fault detection circuit and the plurality of processor cores enters a safe mode (e.g., restart) based on the fault signal.

Thus, the fault detection circuit serves as a handshake module between the safety core and one or more application cores for fault detection. As the fault detection circuit allows a single safety core to verify the execution of multiple applications being run on the application cores, the need for redundancy required by conventional lock-step mechanisms is eliminated. Elimination of redundancy frees up computational resources that may be used for executing other applications and, thus, the efficiency with regards to utilization of computational resources is improved.

Referring now to FIG. 1, a schematic block diagram of a processing system 100 in accordance with an embodiment of the present invention is shown. The processing system 100 may be implemented in any suitable manner. For example, in the embodiment shown, the processing system 100 is implemented as a system-on-chip (SoC). The processing system 100 includes first and second application cores 102a and 102b, a safety core 104, a fault detection circuit 106, and a fault handling sub-system 108 coupled to a microprocessor backbone (not shown). The processing system 100 is embedded within an electronic system such as an automotive system, an aircraft guidance system, a home security system, or an industrial robot. It will be understood by those of ordinary skill in the art that the processing system 100 includes a main memory (not shown) and other circuits used for its operation, which are not shown in order not to obscure the invention.

The first and second application cores 102a and 102b are processor cores that execute first and second applications 110a and 110b, respectively. For example, when the processing system 100 is embedded within an automotive system, each of the first and second applications 110a and 110b may be one of an anti-lock braking application, an airbag control application, and an adaptive cruise control application. The first and second application cores 102a and 102b are associated with domain identifiers that uniquely identify the first and second application cores 102a and 102b. For example, the first application core 102a has 'ID1' as the domain identifier and the second application core 102b has 'ID2' as the domain identifier. The first and second application cores 102a and 102b repeatedly communicate first and second progress data PD1 and PD2 of the first and second applications 110a and 110b, respectively, to the fault detection circuit 106. The first and second progress data PD1 and PD2 indicate current states of operation of the first and second applications 110a and 110b, respectively. The processing system 100 is shown to include two application cores (i.e., the first and second application cores 102a and 102b). However, it will be understood by a person having ordinary skill in the art that the processing system 100 is scalable and can include any number of application cores based on operational requirements of the electronic system.

It will be understood by those of ordinary skill in the art that the scope of the invention is not limited to a single processor core executing a single application or an application being executed by a single processor core. In another embodiment, the first application core 102a performs checking and monitoring operations for other applications in addition to executing the first application 110a. In yet another embodiment, various tasks pertaining to the first application 110a are executed by one or more other application cores instead of a single application core. In such a scenario, the application cores executing the first application 110a repeatedly communicate the first progress data PD1 of the first application 110a to the fault detection circuit 106.

The safety core 104 is a processor core that executes a fault detection program 112, which preferably comprises firmware. The fault detection program 112 is used to verify the execution of the first and second applications 110a and 110b. In other words, the fault detection program 112 detects faults in the execution of the first and second applications 110a and 110b, including both logical faults and timing faults. The safety core 104 loads configuration data including first and second automata (e.g., finite state machines) of the first and second applications 110a and 110b, respectively, from the main memory to its local memory for verifying the execution of the first and second applications 110a and 110b. The configuration data includes machine-readable descriptions of the first and second automata, which represent models of expected behavior of the first and second applications 110a and 110b, respectively.

The safety core 104 periodically reads the first and second progress data PD1 and PD2 from the fault detection circuit 106 for verifying the execution of the first and second applications 110a and 110b. The fault detection program 112 compares the first and second progress data PD1 and PD2 with the states exhibited by the first and second automata, respectively, for detecting faults in the execution of the first and second applications 110a and 110b. In other words, the fault detection program 112 detects anomalies in the execution of the first and second applications 110a and 110b. The fault detection program 112 generates first and second outputs O1 and O2 based on the comparison of the first and second progress data PD1 and PD2 with the states exhibited by the first and second automata, respectively. The first output O1 indicates a result of verification of the first application 110a and the second output O2 indicates a result of verification of the second application 110b.

In one scenario, the first and second outputs O1 and O2 indicate fault free execution of the first and second applications 110a and 110b, respectively. For example, when the first and second progress data PD1 and PD2 respectively match the expected behavior of the first and second applications 110a and 110b, the first and second outputs O1 and O2 indicate no anomalies in the execution of the first and second applications 110a and 110b. In another scenario, the first and second outputs O1 and O2 indicate faulty execution of the first and second applications 110a and 110b, respectively. For example, when there is a mismatch between the first progress data PD1 and the expected behavior of the first application 110a, the first output O1 indicates an anomaly in the execution of the first application 110a and when there is a mismatch between the second progress data PD2 and the expected behavior of the second application 110b, the second output O2 indicates an anomaly in the execution of the second application 110b. The anomalies in the execution of the first and second applications 110a and 110b may be caused due to an incorrect state sequence during the execution, incorrect timing of the state sequence, or an incorrect stay period (i.e., starvation condition) in a state of the state sequence of the application. However, it will be understood by a person having ordinary skill in the art that the faults in the execution of the first and second applications 110a and 110b are not limited to these examples and can include any anomaly that causes the first and second applications 110a and 110b to deviate from their expected behaviors.

The safety core 104 communicates the first and second outputs O1 and O2 and current states of the first and second automata to the fault detection circuit 106. Similar to the first and second application cores 102a and 102b, the safety core 104 also is associated with a domain identifier that uniquely identifies the safety core 104. For example, the safety core 104 has 'ID3' as the domain identifier.

The fault detection circuit 106 is a digital circuit that is in communication with the first and second application cores 102a and 102b and the safety core 104. The first and second application cores 102a and 102b and the safety core 104 access the fault detection circuit 106 by transmitting transaction signals to the fault detection circuit 106. Each transaction signal is associated with the domain identifier of the corresponding core. For example, a transaction signal from the first application core 102a has 'ID1' as the domain identifier and a transaction signal from the safety core 104 has 'ID3' as the domain identifier. Based on the domain identifier associated with a transaction signal, the fault detection circuit 106 identifies the processor core transmitting the transaction signal. For example, when the fault detection circuit 106 receives a transaction signal having the domain identifier as 'ID1', the fault detection circuit 106 identifies the first application core 102a as the source of the transaction signal. Based on the domain identifiers of the transaction signals, the fault detection circuit 106 grants the first and second application cores 102a and 102b and the safety core 104 selective access to the fault detection circuit 106. The selective access is described in detail in conjunction with FIG. 2.

The fault detection circuit 106 allows a handshake between the safety core 104 and the first and second application cores 102a and 102b. For example, the fault detection circuit 106 receives the first and second progress data PD1 and PD2 from the first and second application cores 102a and 102b, respectively, and allows the safety core 104 to read the first and second progress data PD1 and PD2.

The fault detection circuit 106 further receives the first and second outputs O1 and O2 from the safety core 104 and generates a fault signal FS1 when the first output O1 or the second output O2 indicates faulty execution of the first application 110a or the second application 110b, respectively. In a scenario, when the first and second outputs O1 and O2 indicate fault free execution of the first and second applications 110a and 110b, respectively, no fault signal is generated.

The fault detection circuit 106 is connected to the fault handling sub-system 108 for transmitting the fault signal FS1. The fault handling sub-system 108 handles the faults in the first and second applications 110a and 110b by generating an interrupt signal IS1 based on the fault signal FS1. In another embodiment, the fault handling sub-system 108 may receive fault signals from other system components, for example a watchdog timer (not shown), and generate the interrupt signal IS1. The fault handling sub-system 108 is in communication with the first and second application cores 102a and 102b and transmits the interrupt signal IS1 to the first and second application cores 102a and 102b. In one embodiment, the first and second application cores 102a and 102b recover from the faults based on the interrupt signal IS1. In another embodiment, the first and second application cores 102a and 102b begin to operate in a safe mode (e.g., a backup mode or a degraded mode) based on the interrupt signal IS1 when the first and second application cores 102a and 102b are unable to recover from the faults. In yet another embodiment, the electronic system or the processing system 100 resets (i.e., restarts) based on the interrupt signal IS1 when the first and second application cores 102a and 102b are unable to recover from the faults.

The fault detection circuit 106 further generates a timer interrupt signal TIS periodically to trigger execution of the fault detection program 112 by the safety core 104. The fault detection circuit 106 communicates the timer interrupt signal TIS to the safety core 104, thereby causing the safety core 104 to periodically read the first and second progress data PD1 and PD2 from the fault detection circuit 106. The operation of the fault detection circuit 106 is described in more detail in FIG. 2.

Figure 2:
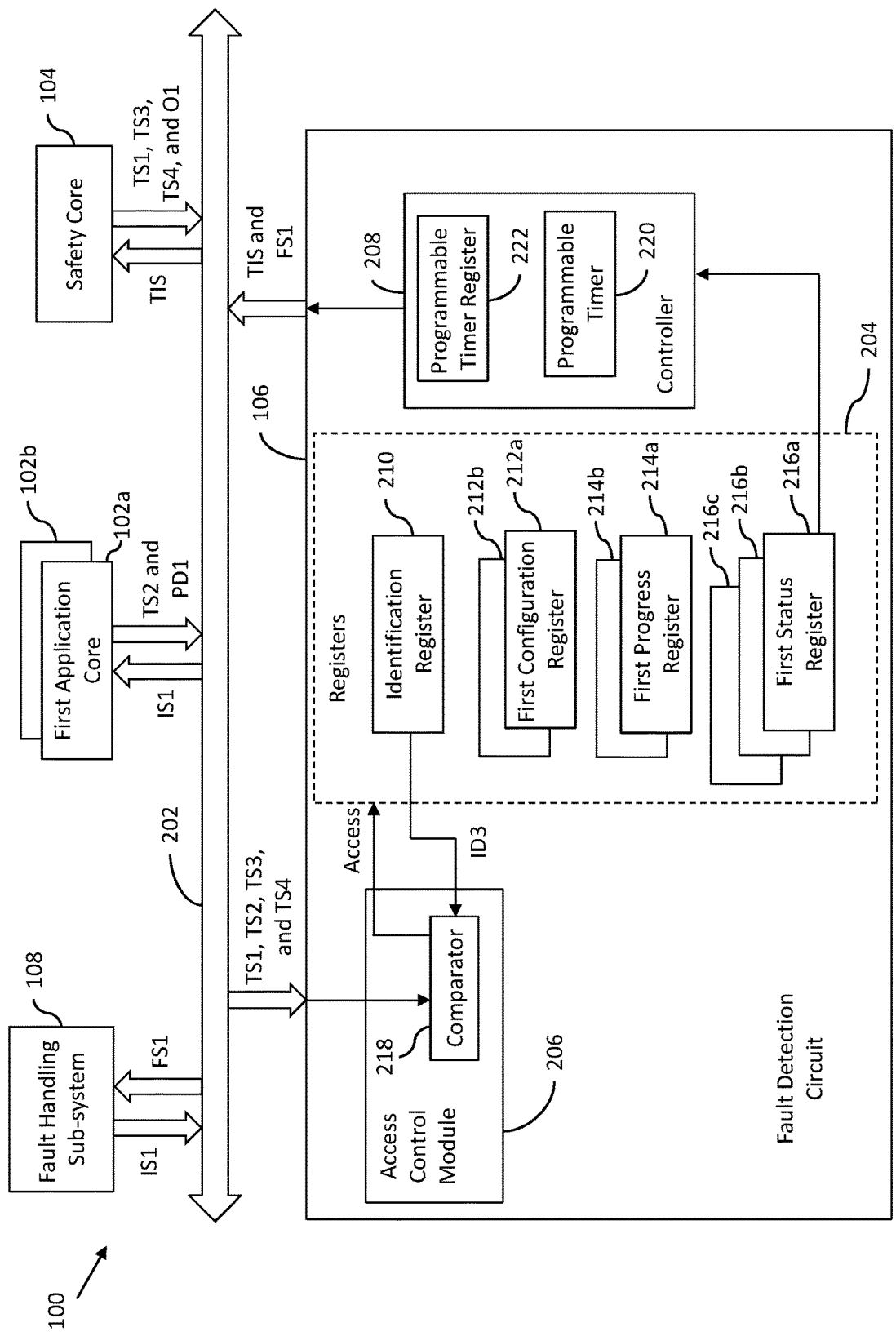
FIG. 2 is a detailed schematic block diagram of the processing system of FIG. 1, in accordance with an embodiment of the present invention.

Referring now to FIG. 2, a detailed schematic block diagram of the processing system 100 (i.e., the SoC) in accordance with an embodiment of the present invention is shown. The first and second application cores 102a and 102b, the safety core 104, the fault detection circuit 106, and the fault handling sub-system 108 communicate with each other by way of a system bus 202 included in the processing system 100. The system bus 202 is a communication interface such as, but not limited to, an advanced microcontroller bus architecture (AMBA), an advanced high-performance bus (AHB), an advanced peripheral bus (APB), an and advanced extensible interface (AXI) bus. The fault detection circuit 106 includes a set of registers 204, an access control module 206, and a controller 208.

The set of registers 204 is a set of n-bit registers (for example, n=1, 8, 16, 32, and the like) for data storage. The set of registers 204 includes an identification register 210, first and second configuration registers 212a and 212b, first and second progress registers 214a and 214b, and first through third status registers 216a-216c.

The identification register 210 stores the domain identifier of the safety core 104. For example, when the domain identifier of the safety core 104 is 'ID3', the identification register 210 stores 'ID3' therein. The domain identifier (i.e., 'ID3') of the safety core 104 is written to the identification register 210 by a boot core (not shown) or any of the first and second application cores 102a and 102b operating as the boot core when the processing system 100 is powered on or reset. The domain identifier can be written to the identification register 210 only once after the processing system 100 is reset or powered on. The identification register 210 includes a first set of bits that is reserved for storing the domain identifier 'ID3' of the safety core 104 and a first status bit for indicating whether the first set of bits has been written. For example, first through fourth bits of the identification register 210 are reserved for storing the domain identifier 'ID3' of the safety core 104 and a fifth bit serves as the first status bit. Upon reset of the processing system 100, the fifth bit has '0' stored therein to indicate that the first through fourth bits have not been written yet. When the first through fourth bits are written with the domain identifier 'ID3' of the safety core 104, the fifth bit is set to '1', thereby indicating that the first through fourth bits have been written and cannot be modified until reset. The domain identifier 'ID3' stored in the identification register 210 is used for granting the selective access to the first and second application cores 102a and 102b and the safety core 104 by distinguishing between transaction signals received from the first and second application cores 102a and 102b and transaction signals received from the safety core 104.

Upon reset of the processing system 100, the fault detection circuit 106 and the safety core 104 (i.e., safety mechanism) are in a disabled state. The first configuration register 212a facilitates enabling and disabling of the fault detection circuit 106 and the safety core 104. One of the boot core, the first application core 102a, and the second application core 102b enables or disables the fault detection circuit 106 and the safety core 104 by writing to the first configuration register 212a. The first configuration register 212a includes a second status bit that is set to enable and reset to disable, the fault detection circuit 106 and the safety core 104. The second configuration register 212b stores a memory address of a memory location in the main memory where the configuration data, including the first and second automata, is stored. The second configuration register 212b is programmed with the memory address by one of the boot core, the first application core 102a, and the second application core 102b. Once programmed, one of the boot core, the first application core 102a, and the second application core 102b locks the first and second configuration registers 212a and 212b by writing to a configuration protection register (not shown). The first and second configuration registers 212a and 212b may be unlocked or locked at any point of time by one of the boot core, the first application core 102a, and the second application core 102 to reconfigure the safety mechanism of the processing system 100.

The first and second progress registers 214a and 214b store the first and second progress data PD1 and PD2 of the first and second applications 110a and 110b, respectively. The first and second application cores 102a and 102b repeatedly report the first and second progress data PD1 and PD2 of the first and second applications 110a and 110b to the first and second progress registers 214a and 214b, respectively. For example, a value of the first progress data PD1 at time instance t1 indicates a state S1 of the first application 110a at the time instance t1.

The first progress register 214a includes a second set of bits reserved for storing the first progress data PD1 reported by the first application core 102a, a written flag bit, and an overwritten flag bit. The written and overwritten flag bits are hardware-maintained flags. The written flag bit is asserted (e.g., set to '1') when the first progress data PD1 is written to the second set of bits. If the written flag bit was already set when the second set of bits is overwritten with the first progress data PD1, then the overwritten flag bit is asserted (e.g., set to '1'). The second progress register 214b is structurally and functionally similar to the first progress register 214a and stores the second progress data PD2 reported by the second application core 102b. The fault detection circuit 106 is shown to include two progress registers (i.e., the first and second progress registers 214a and 214b). However, it will be understood by a person having ordinary skill in the art that the fault detection circuit 106 can include any number of progress registers based on operational requirements of the electronic system.

For the sake of simplicity, the first and second application cores 102a and 102b are shown to execute only the first and second applications 110a and 110b, respectively. Thus, the first and second progress data PD1 and PD2 are reported to the first and second progress registers 214a and 214b, by the first and second application cores 102a and 102b, respectively. However, in a scenario where the first application 110a is executed by multiple application cores, each application core is capable of reporting the first progress data PD1 to the first progress register 214a. Similarly, when the second application 110b is executed by multiple application cores, each application core reports the second progress data PD2 to the second progress register 214b. In yet another scenario where the first application core 102a executes the first application 110a along with the second application 110b, the first application core 102a reports the first and second progress data PD1 and PD2 to the first and second progress registers 214a and 214b, respectively. Similarly, when the second application core 102b executes the second application 110b along with the first application 110a, the second application core 102b reports the first and second progress data PD1 and PD2 to the first and second progress registers 214a and 214b, respectively.

The first status register 216a indicates a current status of the fault detection program 112. The first status register 216a includes first and second flag bits. The first flag bit when reset indicates that there is no fault in the fault detection program 112 and when set indicates a fault in the fault detection program 112. The fault in the fault detection program 112 is caused due to one of a configuration error and an internal error of the fault detection program 112. The configuration error indicates an error in at least one of the first and second automata of the configuration data. The second flag bit when set indicates that the fault detection program 112 is running and when reset indicates that the fault detection program 112 is idle (i.e., stopped).

The second status register 216b stores the first output O1 generated by the fault detection program 112 and the state exhibited by the first automaton. The third status register 216c stores the second output O2 generated by the fault detection program 112 and the state exhibited by the second automaton. The fault detection circuit 106 is shown to include three status registers (i.e., the first through third status registers 216a-216c). However, it will be understood by a person having ordinary skill in the art that the fault detection circuit 106 can include any number of status registers based on operational requirements of the electronic system. For example, when the processing system 100 has four progress registers, the fault detection circuit 106 includes five status registers.

The access control module 206 grants the selective access to the first and second application cores 102a and 102b and the safety core 104 based on a comparison between the domain identifier 'ID3' stored in the identification register 210 and the domain identifiers associated with the transaction signals received from the first and second application cores 102a and 102b and the safety core 104. The access control module 206 includes a comparator 218 for comparing the domain identifiers of the transaction signals with the domain identifier 'ID3' stored in the identification register 210. The result of the comparison may indicate a match or a mismatch between the domain identifiers of the transaction signals and the domain identifier 'ID3' stored in the identification register 210. When there is a mismatch between a domain identifier associated with a transaction signal and the domain identifier 'ID3' stored in the identification register 210, the access control module 206 grants the processor core associated with the transaction signal an access (i.e., a first type of access) to the set of registers 204 based on a first set of access rights. When a domain identifier of a transaction signal matches the domain identifier 'ID3' stored in the identification register 210, the access control module 206 grants the processor core associated with the transaction signal an access (i.e., a second type of access) to the set of registers 204 based on a second set of access rights. Since the domain identifier 'ID3' corresponds to the safety core 104, the access control module 206 grants the safety core 104 an access to the set of registers 204 based on the second set of access rights, and grants the first and second application cores 102a and 102b an access to the set of registers 204 based on the first set of access rights.

The first set of access rights granted to the first and second application cores 102a and 102b includes a read-write access to the first and second configuration registers 212a and 212b, a read-write access to the first and second progress registers 214a and 214b, and a read-only access to the second and third status registers 216b and 216c. The second set of access rights granted to the safety core 104 includes a read-only access to the first and second configuration registers 212a and 212b, a read-only access to the first and second progress registers 214a and 214b, and a read-write access to the first through third status registers 216a-216c.

The controller 208 is a digital logic circuit that is capable of reading the first through third status registers 216a-216c. The controller 208 generates the fault signal FS1 (i.e., the fault signal FS1 is set) when at least one of the values read from the first through third status registers 216a-216c indicates a fault. The controller 208 transmits the fault signal FS1 to the fault handling sub-system 108 by way of the system bus 202.

The controller 208 includes a programmable timer 220 and a programmable timer register 222. The programmable timer register 222 is loaded with a timer value by the safety core 104. The programmable timer 220 runs periodically based on the timer value. In other words, when the programmable timer 220 times out, it is triggered to run again for a duration corresponding to the timer value. The controller 208 generates the timer interrupt signal TIS when the programmable timer 220 times out. The controller 208 transmits the timer interrupt signal TIS to the safety core 104 by way of the system bus 202, thereby triggering the execution of the fault detection program 112 by the safety core 104 for reading the first and second progress registers 214a and 214b.

In operation, when the processing system 100 is reset or powered on, the safety core 104 and the fault detection circuit 106 are initially disabled. The boot core identifies the domain identifier of the safety core 104 (e.g., 'ID3') and writes the domain identifier 'ID3' to the first set of bits of the identification register 210. When the first set of bits is written, the first status bit of the identification register 210 is set to '1', thereby indicating that the domain identifier 'ID3' is written to the first set of bits and the first set of bits cannot be modified until reset.

The boot core unlocks the first and second configuration registers 212a and 212b and writes the memory address, where the configuration data including the first and second automata is stored, to the second configuration register 212b.

The boot core further sets the second status bit of the first configuration register 212a to enable the fault detection circuit 106 and the safety core 104. Once the first and second configuration registers 212a and 212b are programmed, the boot core locks the first and second configuration registers 212a and 212b by writing to the configuration protection register and triggers the fault detection program 112 to start processing based on the configuration data.

The safety core 104 loads the configuration data from the main memory to its local memory and performs consistency checks on the configuration data. Based on the consistency checks, the safety core 104 generates a status indicator indicating the current status of the configuration data. The safety core 104 transmits a first transaction signal TS1 to the fault detection circuit 106 by way of the system bus 202 for accessing the first status register 216a to write the status indicator. Since the first transaction signal TS1 is transmitted by the safety core 104, it has the domain identifier 'ID3'. The access control module 206 thus grants the safety core 104 a read-write access to the first status register 216a based on a match between the domain identifier 'ID3' of the first transaction signal TS1 and the domain identifier 'ID3' stored in the identification register 210. The safety core 104 writes the status indicator to the first status register 216a. Based on the status indicator, the first and second flag bits of the first status register 216a are modified. In one embodiment, if no fault is detected during the consistency checks of the configuration data, the first flag bit is reset and the second flag bit is set to indicate that the fault detection program 112 is running and ready to process the first and second progress data PD1 and PD2. The safety core 104 further loads the programmable timer register 222 with the timer value and the programmable timer 220 starts running based on the timer value.

The first application core 102a executes the first application 110a and repeatedly transmits transaction signals to the fault detection circuit 106 for reporting the first progress data PD1 (i.e., the current state) of the first application 110a. At time instance t1, the first application 110a is in the state S1. The first application core 102a transmits a second transaction signal TS2 to the fault detection circuit 106 by way of the system bus 202 for writing the first progress data PD1, indicating the state S1, to the first progress register 214a. Since the second transaction signal TS2 is transmitted by the first application core 102a, it has the domain identifier 'ID1' of the first application core 102a. The access control module 206 thus grants the first application core 102a a read-write access to the first and second progress registers 214a and 214b based on a mismatch between the domain identifier 'ID1' of the second transaction signal TS2 and the domain identifier 'ID3' stored in the identification register 210. Thus, the first application core 102a writes the first progress data PD1 to the first progress register 214a. When the first progress data PD1 is written to the first progress register 214a, the written flag bit of the first progress register 214a is set and the overwritten flag bit of the first progress register 214a remains in a cleared state. However, if the written flag bit of the first progress register 214a was already set when the first progress data PD1 is written to the first progress register 214a, then the overwritten flag bit of the first progress register 214a is set.

When the programmable timer 220 times out, the controller 208 generates the timer interrupt signal TIS and the programmable timer 220 is re-triggered based on the timer value. The controller 208 transmits the timer interrupt signal TIS to the safety core 104 for triggering the reading of the first and second progress registers 214a and 214b, respectively, by the fault detection program 112. In other words, the programmable timer 220 triggers periodic read of the first and second progress registers 214a and 214b by periodically generating the timer interrupt signal TIS.

The safety core 104 receives the timer interrupt signal TIS and transmits a third transaction signal TS3 to the fault detection circuit 106 for reading the first progress register 214a. The access control module 206 thus grants the safety core 104 a read-only access to the first and second progress registers 214a and 214b based on a match between the domain identifier 'ID3' of the third transaction signal TS3 and the domain identifier 'ID3' stored in the identification register 210.

The safety core 104 reads the first progress data PD1, the written flag bit, and the overwritten flag bit from the first progress register 214a, all at the same time. The read operation initiated by the safety core 104 clears the written and overwritten flag bits of the first progress register 214a. The fault detection program 112 compares the first progress data PD1 (i.e., the state S1) with the expected behavior (i.e., the expected state of operation) exhibited by the first automaton at the time instance t1. Based on the comparison, the fault detection program 112 generates the first output O1. The fault detection program 112 stores the first output O1 in the local memory of the safety core 104 and transmits a fourth transaction signal TS4 to the fault detection circuit 106 for writing the first output O1 and the current state exhibited by the first automaton to the second status register 216b.

The access control module 206 thus grants the safety core 104 a read-write access to the second status register 216b as the domain identifier 'ID3' of the fourth transaction signal TS4 matches the domain identifier 'ID3' stored in the identification register 210. Thus, the safety core 104 writes the first output O1 and the current state of the first automaton to the second status register 216b. The controller 208 reads the first output O1 from the second status register 216b.

In one scenario, when the first output O1 indicates a fault in the execution of the first application 110a, the controller 208 generates the fault signal FS1 and transmits the fault signal FS1 to the fault handling sub-system 108 by way of the system bus 202. On receiving the fault signal FS1, the fault handling sub-system 108 generates the interrupt signal IS1 and transmits the interrupt signal IS1 to the first application core 102a. Based on the interrupt signal IS1, the first application core 102a either recovers from the fault or enters the safe mode. In an alternate scenario, when the first output O1 indicates a fault free execution of the first application 110a, the controller 208 does not generate the fault signal FS1.

In another embodiment, if a fault is detected during the consistency checks performed by the safety core 104, the first flag bit of the first status register 216a is set and the second flag bit of the first status register 216a is reset based on the status indicator generated by the safety core 104. The fault may be caused due to one of the internal error and the configuration error in the configuration data. The controller 208 reads the first flag bit of the first status register 216a and generates the fault signal FS1 to be transmitted to the fault handling sub-system 108 by way of the system bus 202. Consequently, the fault handling sub-system 108 forces the processing system 100 into the safe mode or resets the processing system 100 based on the fault signal FS1.

In another embodiment, functions performed by the boot core are performed by one of the first application core 102a and the second application core 102b without deviating from the scope of the invention. In one embodiment, the fault handling sub-system 108 receives a fault signal from the watchdog timer, monitoring the safety core 104, when the controller 208 fails to generate the timer interrupt signal TIS at the timing out of the programmable timer 220.

The first application core 102a continues to report the first progress data PD1 to the first progress register 214a and the safety core 104 continues to read the first progress data PD1 periodically for verifying the execution of the first application 110a as described above. It will be understood by a person having ordinary skill in the art that the fault detection for faults in applications (for example, the second application 110b) executed elsewhere (for example, the second application core 102b) is performed in a manner that is similar to the detection of faults in the first application 110a as described above.

Figure 3A:
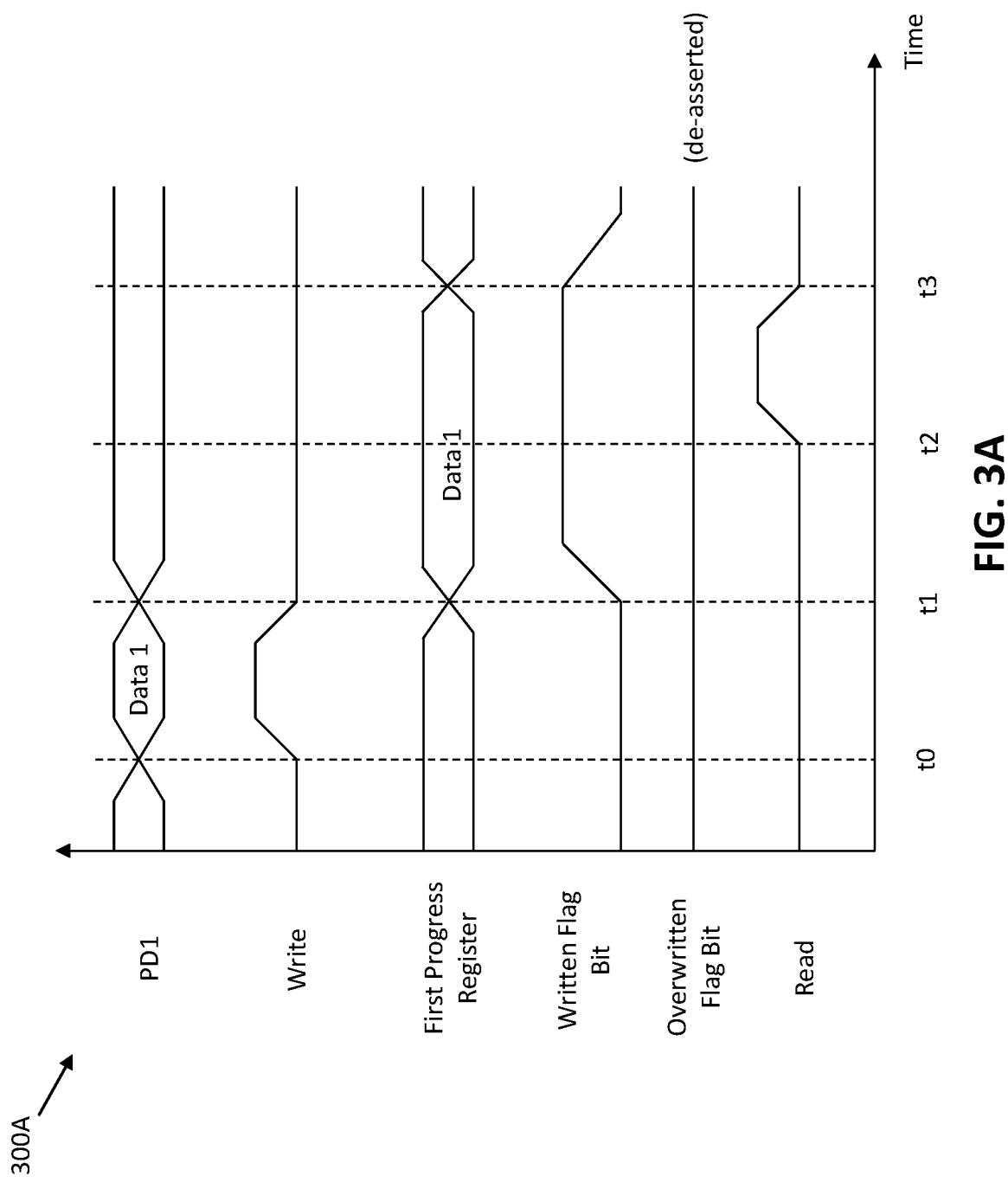
FIG. 3A is a timing diagram that illustrates read and write operations performed on a progress register of the fault detection circuit of FIGS. 1 and 2, in accordance with an embodiment of the present invention.

Referring now to FIG. 3A, a timing diagram 300A that illustrates read and write operations performed on the first progress register 214a in accordance with an embodiment of the present invention is shown. The first application core 102a repeatedly writes the first progress data PD1 to the first progress register 214a and the safety core 104 periodically reads the first progress data PD1 from the first progress register 214a.

At time instance t0, the first application core 102a initiates a write operation for writing the first progress data PD1 (here, Data 1) to the first progress register 214a. The written and overwritten flag bits of the first progress register 214a are in a de-asserted state at the time instance t0. At time instance t1, the first application core 102a completes the write operation and the Data 1 is written to the first progress register 214a. The fault detection circuit 106 asserts the written flag bit of the first progress register 214a and the overwritten flag bit continues to remain in the de-asserted state. At time instance t2, the safety core 104 initiates a read operation and reads the Data 1 and the written and overwritten flag bits, simultaneously, from the first progress register 214a. At time instance t3, the safety core 104 completes the read operation. When the read operation is complete, the fault detection circuit 106 de-asserts the written flag bit.

Figure 3B:
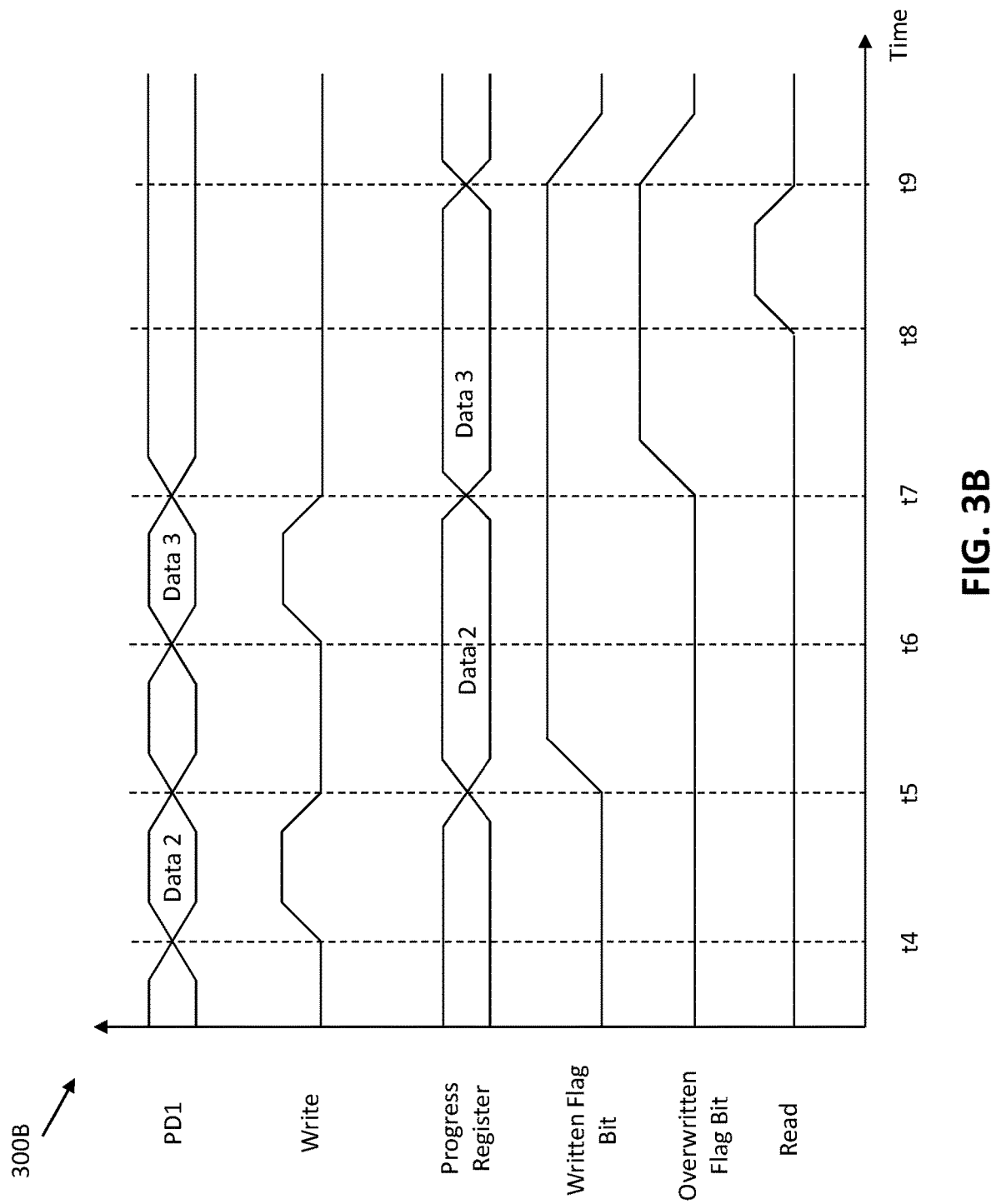
FIG. 3B is another timing diagram that illustrates read and write operations performed on the progress register of the fault detection circuit of FIGS. 1 and 2, in accordance with another embodiment of the present invention.

Referring now to FIG. 3B, another timing diagram 300B that illustrates read and write operations performed on the first progress register 214a in accordance with another embodiment of the present invention is shown. The first application core 102a repeatedly writes the first progress data PD1 to the first progress register 214a and the safety core 104 periodically reads the first progress data PD1 from the first progress register 214a.

At time instance t4, the first application core 102a initiates a write operation for writing the first progress data PD1 (here, 'Data 2') to the first progress register 214a. The written and overwritten flag bits of the first progress register 214a are in a de-asserted state at the time instance t4. At time instance t5, the first application core 102a completes the write operation and the Data 2 is written to the first progress register 214a. The fault detection circuit 106 asserts the written flag bit of the first progress register 214a and the overwritten flag bit continues to remain in the de-asserted state. Before the Data 2 is read by the safety core 104, at time instance t6, another write operation is initiated by an application core (e.g., the first application core 102a) for writing the first progress data PD1 (i.e., Data 3) to the first progress register 214a. At time instance t6, the overwritten flag bit is in the de-asserted state and the written flag bit is in the asserted state due to the previous write operation performed at the time instance t4.

At time instance t7, the write operation is completed and the Data 3 is written to the first progress register 214a. Since the written flag bit was in the asserted state at the time of writing the Data 3 to the first progress register 214a, the fault detection circuit 106 asserts the overwritten flag bit. At time instance t8, the safety core 104 initiates a read operation and reads the Data 3 and the written and overwritten flag bits, simultaneously, from the first progress register 214a. At time instance t9, the safety core 104 completes the read operation. When the read operation is completed, the fault detection circuit 106 de-asserts the written and overwritten flag bits. As both the written and overwritten flag bits of the first progress register 214a were asserted, the safety core 104 writes the first output O1 to the second status register 216b indicating a fault in the execution of the first application 110a.

It will be apparent to a person having ordinary skill in the art that the read and write operations are performed on the second progress register 214b in a similar manner as described above.

The system 100 includes the fault detection circuit 106 that enables handshaking between the safety core 104 and one or more application cores (such as the first and second application cores 102a and 102b). Thus, the need for redundancy in the system is eliminated. In contrast to the lock-step fault detection mechanism that relies on redundancy for detecting faults in the execution of applications, the system 100 uses a single safety core (i.e., the safety core 104) to verify execution of a plurality of applications (such as the first and second applications 110a and 110b) being run on the plurality of application cores. Consequently, computational resources are freed up for accommodating new applications rather than running the same applications in parallel on multiple cores (spatial redundancy) or running the same/similar application on the same core (temporal redundancy). Hence, the efficiency with regards to the utilization of computational resources (such as computing power) is improved.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A fault detection circuit in communication with a plurality of processor cores, wherein the plurality of processor cores includes an application core and a safety core, the fault detection circuit comprising:
a progress register for storing progress data of an application executed by the application core, wherein the progress data is written to the progress register by the application core, and wherein the progress data is read by the safety core for verifying the execution of the application;
a status register for storing an output of a fault detection program executed by the safety core, wherein the fault detection program generates the output based on the progress data, and wherein the output is written to the status register by the safety core; and
a controller for reading the output stored in the status register, wherein the controller generates a fault signal when the output indicates a fault in the execution of the application.

2. The fault detection circuit of claim 1, wherein when the fault signal is set, the plurality of processor cores run in a safe mode.

3. The fault detection circuit of claim 1, further comprising a configuration register for storing an address of a memory location used to store configuration data comprising a machine-readable description of an automata representing a model of expected behavior of the application executed by the application core, wherein the fault detection program reads the configuration data and generates the output based on a comparison between the progress data and the expected behavior of the application.

4. The fault detection circuit of claim 3, wherein the fault detection circuit receives a first and a second transaction signal from the application and safety cores, respectively, for accessing the progress register, the status register, and the configuration register.

5. The fault detection circuit of claim 4, further comprising:
an identification register for storing a first identifier; and
a comparator for comparing the first identifier with a second and a third identifier associated with the first and second transaction signals, respectively, wherein the fault detection circuit grants the application core a first type of access and the safety core a second type of access, based on the comparison.

6. The fault detection circuit of claim 5, wherein the first type of access is at least one of:
a read-only access to the configuration register,
a read-only access to the progress register, and
a read-write access to the status register.

7. The fault detection circuit of claim 5, wherein the second type of access is at least one of:
a read-only access to the configuration register,
a read-only access to the progress register, and
a read-write access to the status register.

8. The fault detection circuit of claim 1, wherein the progress register comprises:
a first set of bits for storing the progress data generated by the application core;
a first flag bit that is set when the application core writes the progress data to the progress register; and
a second flag bit that is set when the first flag bit is set, and the application core overwrites the progress data in the progress register, wherein the first and second flag bits are cleared when the safety core reads the first set of bits and the first and second flag bits, simultaneously.

9. The fault detection circuit of claim 1, wherein the controller comprises:
a programmable timer register for storing a timer value, wherein the timer value is loaded into the programmable timer register by the safety core; and
a programmable timer that runs periodically based on the timer value, wherein the controller generates a timer interrupt signal when the programmable timer times out, and wherein the controller provides the timer interrupt signal to the safety core for enabling periodic execution of the fault detection program by the safety core.

10. The fault detection circuit of claim 1, wherein the fault in the execution of the application is caused when one of a state sequence of the application, a timing of the state sequence, and a stay period of at least one state of the state sequence, is incorrect.

11. A processing system, comprising:
a plurality of processor cores including an application core and a safety core, wherein an application is executed on the application core and a fault detection program is executed on the safety core, wherein the fault detection program verifies the execution of the application; and a fault detection circuit in communication with the plurality of processor cores, wherein the fault detection circuit comprises:
   a progress register for storing progress data of the application, wherein the progress data is written to the progress register by the application core, and wherein the progress data is read by the safety core;
   a status register that stores an output of the fault detection program, wherein the fault detection program generates the output based on the progress data, and wherein the output is written to the status register by the safety core; and
   a controller that reads the output stored in the status register and generates a fault signal when the output indicates a fault in the execution of the application.

12. The processing system of claim 11, wherein when the fault signal is set, the plurality of processor cores run in a safe mode.

13. The processing system of claim 11, wherein the fault detection circuit further comprises:
   a configuration register that stores an address of a memory location used to store configuration data indicating a behavior of the application executed on the application core, wherein the fault detection program reads the configuration data and generates the output based on a comparison between the progress data and the behavior of the application.

14. The processing system of claim 13, wherein the fault detection circuit receives a first and a second transaction signal from the application and safety cores, respectively, for accessing the progress register, the status register, and the configuration register.

15. The processing system of claim 14, wherein the fault detection circuit further comprises:
   an identification register for storing a first identifier; and
   a comparator for comparing the first identifier with a second and a third identifier associated with the first and second transaction signals, respectively, wherein the fault detection circuit grants the application core a first type of access and the safety core a second type of access, based on the comparison.

16. The fault detection circuit of claim 15, wherein the first type of access is at least one of:
   a read-only access to the configuration register,
   a read-only access to the progress register, and
   a read-write access to the status register.

17. The fault detection circuit of claim 16, wherein the second type of access is at least one of:
   a read-only access to the configuration register,
   a read-only access to the progress register, and
   a read-write access to the status register.

18. The processing system of claim 11, wherein the progress register comprises:
   a first set of bits for storing the progress data generated by the application core;
   a first flag bit that is set when the application core writes the progress data to the progress register; and
   a second flag bit that is set when the first flag bit is set, and the application core overwrites the progress data in the progress register, wherein the first and second flag bits are cleared when the safety core reads the first set of bits and the first and second flag bits, simultaneously.

19. The processing system of claim 11, wherein the controller comprises:
   a programmable timer register that stores a timer value, wherein the timer value is loaded into the programmable timer register by the safety core; and
   a programmable timer that runs periodically based on the timer value, wherein the controller generates a timer interrupt signal when the programmable timer times out, and wherein the controller provides the timer interrupt signal to the safety core for enabling periodic execution of the fault detection program by the safety core.

20. The processing system of claim 11, wherein the fault in the execution of the application is caused when one of a state sequence of the application, a timing of the state sequence, and a stay period of at least one state of the state sequence, is incorrect.

* * * * *